United States Patent
Samain et al.

(10) Patent No.: US 7,252,335 B2
(45) Date of Patent: Aug. 7, 2007

(54) LUMBAR WITH FLEXWIRES IN CROSS

(75) Inventors: Maxime Arthur Maurice Samain, Izegem (BE); Maarten Vanparys, Meulebeke (BE)

(73) Assignee: L&P Property Management Company, South Gate, CA (US)

( * ) Notice: Subject to any disclaimer, the term of this patent is extended or adjusted under 35 U.S.C. 154(b) by 464 days.

(21) Appl. No.: 10/799,044

(22) Filed: Mar. 12, 2004

(65) Prior Publication Data
US 2005/0200178 A1    Sep. 15, 2005

(51) Int. Cl.
A47C 7/46    (2006.01)
(52) U.S. Cl. .................. 297/284.4; 297/284.1
(58) Field of Classification Search ........... 297/284.1, 297/284.4, 284.8, 452.52, 452.63; 267/110, 267/111, 112, 131, 133, 160, 164, 65
See application file for complete search history.

(56) References Cited

U.S. PATENT DOCUMENTS

| | | | | |
|---|---|---|---|---|
| 2,273,273 A | * | 2/1942 | Kris | 267/112 |
| 3,145,987 A | * | 8/1964 | Goodman | 267/104 |
| 4,627,661 A | * | 12/1986 | Ronnhult et al. | 297/284.4 |
| 4,715,653 A | | 12/1987 | Hattaori et al. | |
| 5,474,358 A | * | 12/1995 | Maeyaert | 297/284.7 |
| 5,823,620 A | | 10/1998 | Le Caz et al. | |
| 5,988,745 A | | 11/1999 | Deceuninck | 297/284.4 |
| 6,152,531 A | | 11/2000 | Deceuninck | 297/284.4 |
| 6,402,246 B1 | | 6/2002 | Mundell | 297/284.4 |
| 6,499,803 B2 | * | 12/2002 | Nakane et al. | 297/284.4 |
| 6,557,938 B1 | | 5/2003 | Long | 297/284.4 |
| 6,595,585 B2 | | 7/2003 | Mundell | 297/284.4 |
| 6,994,399 B2 | * | 2/2006 | Van-Thournout et al. | 297/284.4 |
| 2001/0043002 A1 | | 11/2001 | Hidetoshi et al. | |
| 2003/0085600 A1 | * | 5/2003 | Mori | 297/284.4 |
| 2004/0155501 A1 | * | 8/2004 | McMillen et al. | 297/284.4 |

FOREIGN PATENT DOCUMENTS

| | | |
|---|---|---|
| EP | 60874575 | 1/1997 |
| EP | 0803400 A | 10/1997 |
| GB | 1512028 A | 5/1978 |

OTHER PUBLICATIONS

International Search Report.

* cited by examiner

*Primary Examiner*—David Dunn
*Assistant Examiner*—Noah Chandler Hawk
(74) *Attorney, Agent, or Firm*—Husch & Eppenberger LLC; Grant D. Kang; Dennis J. M. Donahue, III

(57) ABSTRACT

This invention is a lumbar support device with a pair of side rails, a plurality of transverse wires and a pair of cross-bars extending between the pair of side rails. The lumbar support device is designed for a seat back of a vehicle seat to support an occupant's lumbar region. The invention is designed to include an actuator assembly for changing the contour of the lumbar support device.

45 Claims, 3 Drawing Sheets

LUMBAR WITH FLEXWIRES IN CROSS

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

The present invention relates generally to lumbar support devices. More particularly, the present invention is a lumbar support device in the seat back of a vehicle seat for supporting an occupant's lumbar region. The present invention involves a lumbar support device comprising a wire framework having two side rails adapted to be suspended in a seat frame and between which extend a plurality of transverse wires. The present invention is designed with cross-bars to create a stiffer lumbar feeling without creating a "hole" effect just above the lumbar region.

2. Related Art

Lumbar support systems are important for assisting an individual in achieving an anatomically correct seating posture. Incorrect seating posture can lead to lower back pain, increased muscle activation, increased tension on ligaments, and increased pressure on the spine. Moreover, lack of lumbar support causes discomfort to the individual in the seated position. Particularly in a car seat, the problems that stem form incorrect seating posture, i.e. lower back pain and uncomfortability, may lead to reduced concentration and reduced driving safety. Accordingly, it is important for a car seat to have the correct lumbar support for both the comfortability of the driver and for his or her safety.

The known lumbar support devices do not effectively support the lumbar region. Some of these lumbar supports are ineffective because the whole seat moves forward instead of just the lumbar region. This does not effectively support the lumbar region. Further, other lumbar supports that move independently of the seat do not provide the effective support. Often a hole effect occurs in which there is a gap in the support of the lower back. Moreover, these support systems are not stiff or durable. Support systems with baskets add increased stiffness and durability. However, baskets often result in a punctual effect. This punctual effect occurs because the lumbar support is restricted to one line or one point. Moreover, some of the supports with baskets create an aggressive situation which is not comfortable to the individual. These baskets are also more expensive to manufacture than lumbar supports without baskets because they require more material and labor. In the past, efforts have been made to stiffen the lumbar area by extra wires, such as extra horizontal wires in U.S. Pat. Nos. 6,152,531 and 5,988,745, as well as other techniques. However, many prior art devices continue to produce the hole effect above the stiffer lumbar area.

SUMMARY OF THE INVENTION

One aspect of the present invention relates to a lumbar support device having a pair of side rails, a plurality of transverse wires extending between the side rails, a pair of cross bars extending between the side rails, a seat frame, and an actuator assembly which operatively connects to the side rails and seat frame to change the curvature of the lumbar support device. It is the main object of this present invention to provide cross-bars in the lumbar region to create stiffer lumbar support without creating a "hole" effect just above the lumbar region. The present invention is also designed with cross-bars to eliminate the "punctual effect" that occurs with lumbar support devices.

Another aspect of the present invention pertains to the lumbar support device comprising cross-bars that may be connected at varying points on the side rails to adjust the apex height. The present invention may also be designed with cross-bars having greater average bending stiffness than the transverse wires. This increased average bending stiffness provides increased stiffness in the lumbar region.

Another aspect of the present invention pertains to the lumbar support device comprising transverse wires with varying degrees of average bending stiffness. The varying bending stiffness provides varying curvature change in various portions of the seat back. Accordingly, the present invention is designed to provide adequate comfort in each area of the seat.

In another aspect of the present invention, the support device may also be used in a seat base, chair, or other arrangements wherein the contour of a seat cushion is desired to be adjusted.

In another aspect of the present invention, the support device may be designed with bends in the transverse wires. These bends create an increased suspension effect which increases comfort.

It is the purpose of the present invention to provide a lumbar support device that is simple and affordable to manufacture. The present invention may be manufactured from a normal outline by increasing the length of the side rails. The side rails may be pre-bended near their ends in one of the first steps of the outline. Then, the side rails may be bended in a shepherd hook formation and clipped together on the opposite side rail.

It is a further purpose of the present invention to provide a lumbar support device with increased durability.

It is a further purpose of the present invention to provide a mechanically simplified lumbar support device that provides the appropriate stiffness in the lumbar region without creating a "hole" effect.

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
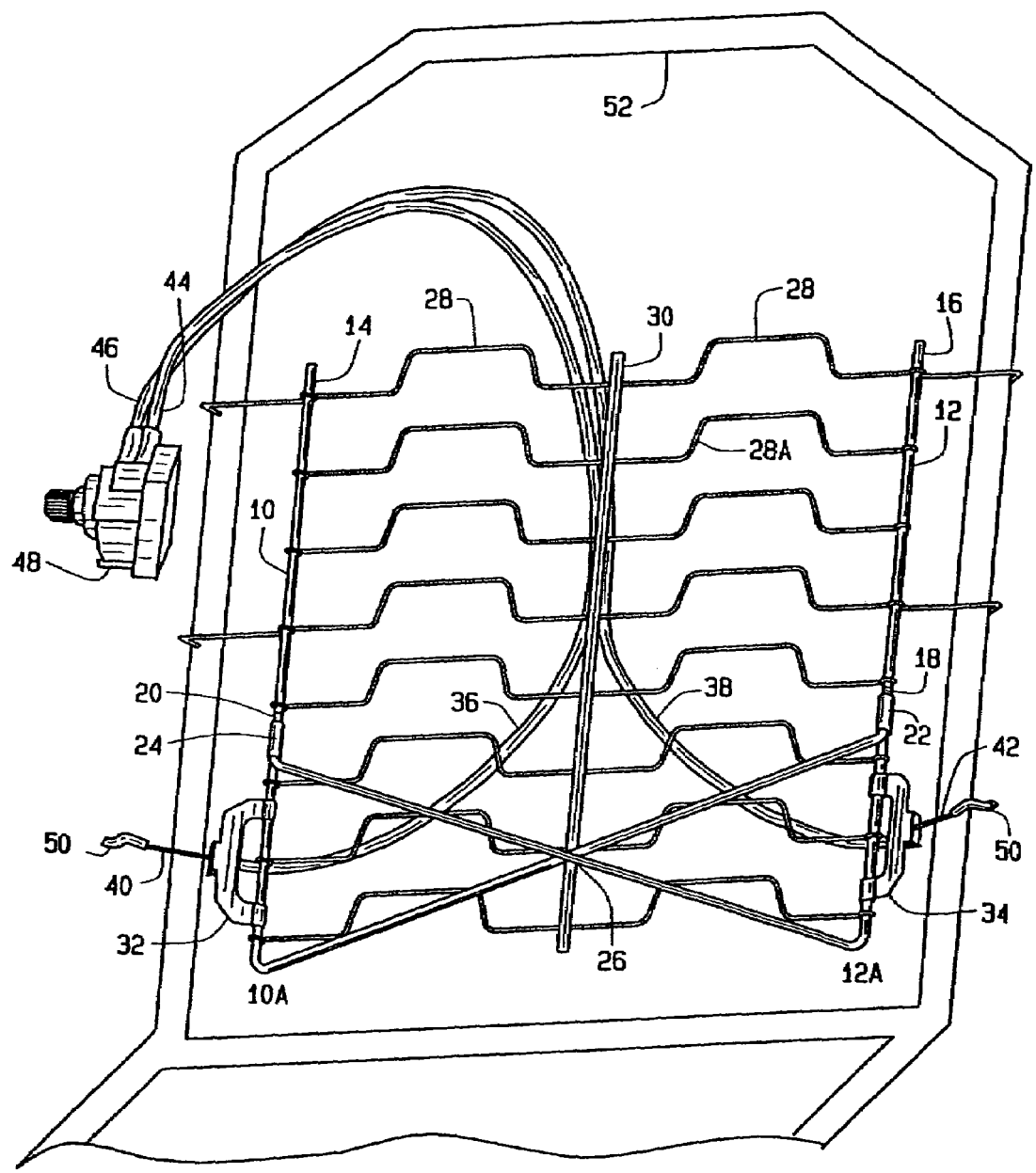
FIG. 1 illustrates the preferred embodiment of the lumbar support device installed in a seat frame.
Figure 2:
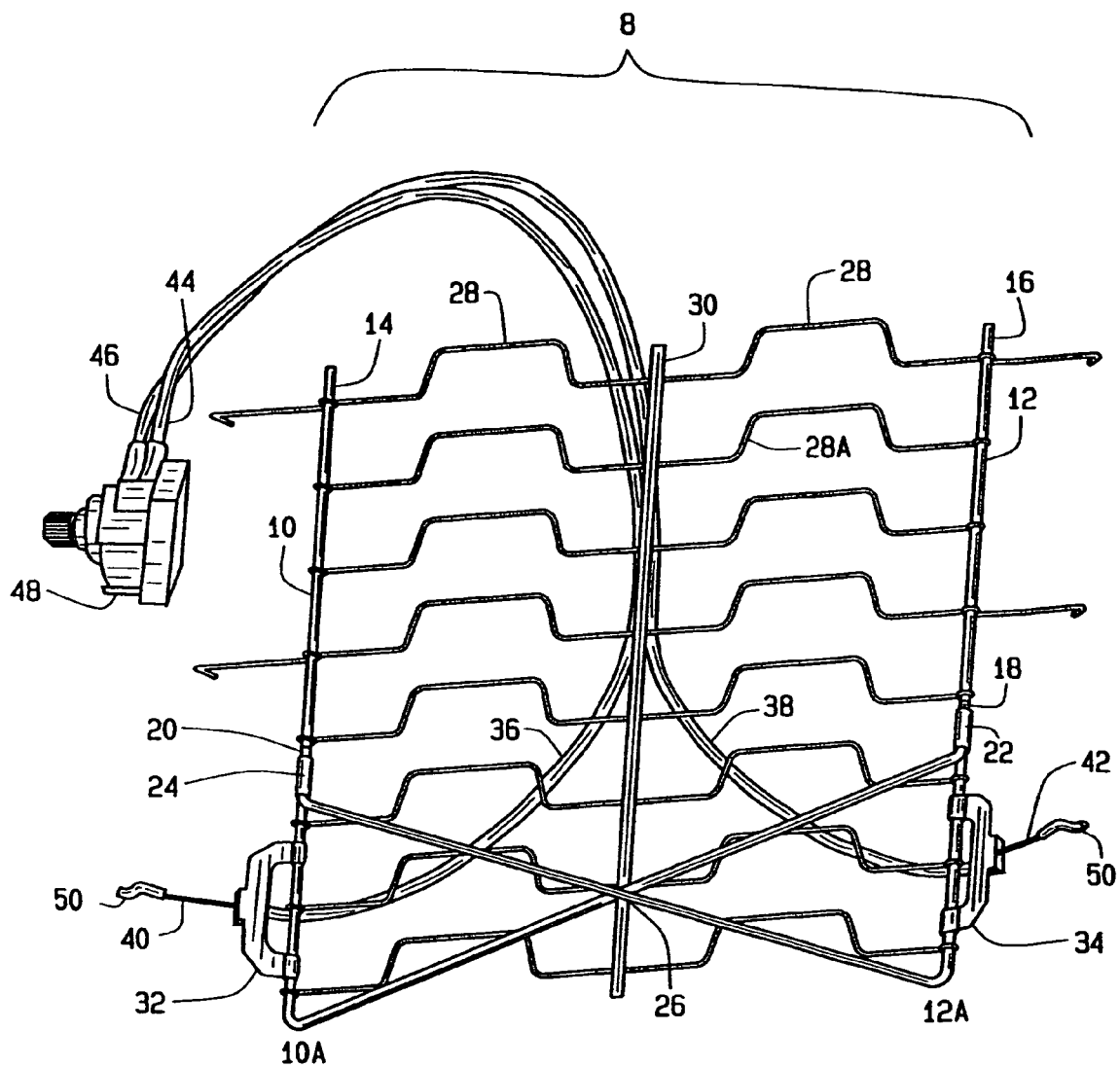
FIG. 2 illustrates a front view of the preferred embodiment of the lumbar support device.
Figure 3:
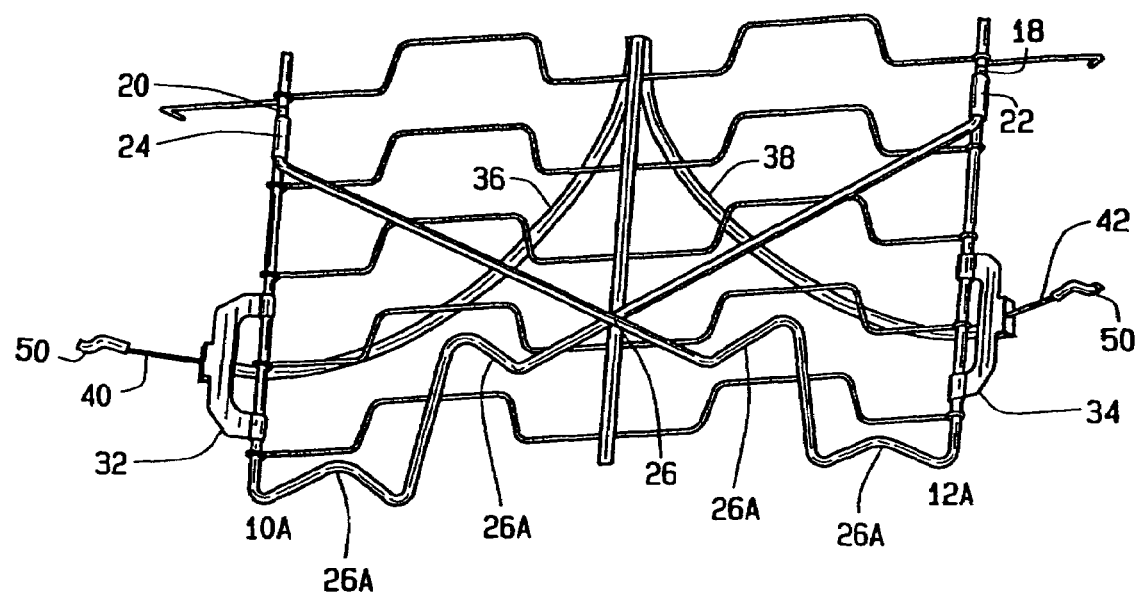
FIG. 3 illustrates the preferred embodiment of the lumbar support device having bends is the cross.

As shown in FIGS. 1-3, the preferred embodiment of the lumbar support device (8) for a seat back of a vehicle includes a pair of side rails (10 and 12) having first ends (14 and 16) and second ends (18 and 20). The side rails (10 and 12) are comprised of paper wrapped or plastic coated steel wire. Side rail (10) is angled at (10A) and the second end (18) of side rail (10) is attached to side rail (12). Side rail (12) is angled at (12A) and the second end (20) of side rail (12) is attached to side rail (10). These attachments are made by clips (22 and 24). These connections form a cross or X-shape (26). The side rails may incorporate bends (26A) in the cross as shown in FIG. 3. A plurality of transverse supporting wires (28) are provided between the side rails (10 and 12). These transverse supporting wires (28) are wound around the side rails (10 and 12) to fixedly attach. However, the transverse supporting wires may be fixedly attached to the side rails by other means known in the art or any equivalents developed in the future. These transverse supporting wires (28) are angled (28A) so that they form sinuous wire springs allowing for limited transverse stretching of the platform element. The transverse supporting wires (28) may be interconnected at their mid points by a central longitudinal cord or tube (30). The transverse supporting wires (28) penetrate the central longitudinal cord (30).

In the preferred embodiment, one or a plurality of the transverse supporting wires (28) is wound around the side rails (10 and 12) and extends past the side rail to attach frame. This attachment suspends the platform in the seat frame (52). However, this suspension may be achieved by other means known in the art, such as wire links, or any equivalent developed in the future.

In the preferred embodiment, a pair of brackets (32 and 34) are fixedly attached to the side rails (10 and 12). A pair of Bowden cables (36 and 38) have first ends (40 and 42) and second ends (44 and 46), respectively. The first ends (40 and 42) of the Bowden cables are slidably inserted through brackets (32 and 34), respectively. The second ends of the Bowden cables (44 and 46) are fixedly attached to a manually actuatable adjusting mechanism (48). The first ends (40 and 42) link to a seat frame by anchor portions (50).

Upon actuation of the cable mechanism, the position of the lumbar support device (8) that is linked to the Bowden cables (44 and 46) extends in a concave shape relative to the seat flame. Thus, the degree of lumbar support provided by the platform element can be increased by actuation of the mechanism. In the preferred embodiment, only the contour of the lumbar support device (8) is displaced rather than the platform element itself.

In view of the foregoing, it will be seen that the several advantages of the invention are achieved and attained. For example, the pair of cross bars extending between the side rails and the plurality of transverse wires extending between the side rails for the lumbar device in the seat frame allow for curvature of the lumbar support device while also providing stiffer lumbar support and without resulting in the undesired "hole" effect in and around the lumbar region. The cross-bars also reduce the "punctual effect" that occurs with other similar lumbar support devices. As discussed above, the cross-bars that may be also be connected at varying points on the side rails and this can be useful in adjusting the apex height, while other embodiments may also be used with actuators to translate the lumbar within the seat. The cross-bars also provide greater average bending stiffness than the transverse wires alone, which can provide increased stiffness in the lumbar region. Varying the bending stiffness can provide varying curvature change in different portions of the seat back. As also discussed above, the support device according to the present invention may also be used in a seat base, chair, or other arrangements, such as wherein the contour of a seat cushion is desired to be adjusted. Further, the support device may be designed with bends in the transverse wires which can increase the suspension effect of the device.

Additionally, the lumbar support device is simple and affordable to manufacture and with improved durability. For example, the preferred embodiment of device is a mechanically simplified lumbar support device in comparison to many other types of lumbar devices, yet it provides good stiffness in the lumbar region without creating a "hole" effect and will be less prone to fail than more complicated designs. The present invention may be manufactured from a normal outline by increasing the length of the side rails. The side rails may be pre-bended near their ends in one of the first steps of the outline. Then, the side rails may be bended in a shepherd hook formation and clipped together on the opposite side rail.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. For example, while the present invention is primarily designed to be used in a seat back, it will be appreciated that embodiments of the present invention may also be used in a seat base, chair, or other arrangements wherein the contour of a seat cushion is desired to be adjusted. As yet another example, although the preferred embodiment of the present invention uses clip attachments for connecting the two cross rails and forming a cross, it will be appreciated that other attachments may be used such as a clip, screw, clasp, as well as any other equivalent type of attachment which may now be known or developed in the future. For example, even though the preferred embodiment is disclosed with discrete attachments, it will be appreciated that the connections between the side rails can be made by winding one cross rail around the other cross rail in a manner that is equivalent to the winding of the transverse supporting wires (28) around the side rails (10 and 12). Thus, the breadth and scope of the present invention should not be limited by any of the above-described exemplary embodiments, but should be defined only in accordance with the following claims appended hereto and their equivalents.

What is claimed is:

1. A seatback lumbar support structure comprising:
   a pair of side rails, each comprising an upper portion, a middle portion, and a lower portion; said portions corresponding to each other on the respective pair of side rails;
   a pair of cross-bars connecting said pair of side rails and crossing each other at a location between at least one of said lower portions, said middle portions and said upper portions of said side rails, said pair of cross-bars being extensions of said pair of side rails and forming an X-shape in crossing each other, wherein each one of said pair of cross-bars extends from its respective side rail to the other respective side rail; and a plurality of transverse wires extending between said pair of side rails, wherein said pair of cross-bars have an average bending stiffness greater than at least one of said transverse wires.

2. The support structure as in claim 1 wherein said pair of cross-bars are fixedly attached to said pair of side rails with clips.

3. The support structure as in claim 1 wherein said pair of cross-bars incorporate angled portions.

4. The support structure as in claim 1 wherein said transverse wires incorporate angled portions.

5. The support structure as in claim 1 wherein said transverse wires are wound around said side rails to fixedly attach.

6. The support structure as in claim 1, further comprising a seat frame, wherein said support structure is suspended in said seat frame.

7. The support structure as in claim 1 wherein one or a plurality of said transverse wires extend laterally beyond said side rails after having been wound around said wires.

8. The support structure as in claim 7, further comprising a seat frame wherein one or a plurality of said transverse wires extending beyond said side rails connects to said seat frame.

9. The support structure as in claim 1 wherein one or a plurality of brackets are fixedly attached to said side rails.

10. The support structure as in claim 9 further comprising a seat frame wherein one or a plurality of said brackets fixedly attach to said seat frame.

11. The support structure as in claim 1, further comprising a central longitudinal cord, said central longitudinal cord is fixedly attached to the mid points of said transverse wires.

12. The support structure as in claim 1, further comprising an adjusting mechanism operatively connected to said side rails.

13. The support structure as in claim 1, further comprising a pair of brackets, wherein one of said brackets is fixedly attached to one of said side rails.

14. The support structure as in claim 13, further comprising a pair of Bowden cables; wherein each of said Bowden cables has a first end and a second end and each of said first ends are slidably inserted through one of said brackets.

15. The support structure as in claim 14, further comprising an actuator, wherein said second ends of said Bowden cables are fixedly attached to said actuator.

16. The support structure as in claim 1, wherein the average bending stiffness of all of said pair of cross-bars is greater than the average bending stiffness of said transverse wires.

17. The support structure as in claim 1, wherein said pair of cross-bars are extensions of at least one of said upper portion and lower portion of said side rails.

18. A seatback lumbar support structure comprising:
a first side rail and a second side rail, each comprising a first portion and a second portion, wherein said first portion and said second portion are rail sections selected from the group consisting of an upper portion, a middle portion, and a lower portion, wherein said upper portion, said middle portion and said lower portion correspond to each other on the first side rail and second side rail, respectively and the first and second protions of repective side rails consist of the same upper, middle or lower portions of the respective rails;

a first cross-bar extending from and connecting said first portion of said first side rail to said second portion of said second side rail;

a second cross-bar extending from and connecting said first portion of said second side rail to said second portion of said first side rail;

a plurality of transverse wires extending between said pair of side rails, wherein an average bending stiffness of at lease one of said first cross-bar and said second cross-bar is greater than at least one of said transverse wires.

19. The support structure as in claim 18 wherein said first cross bar and said second cross-bar are fixedly attached to said first side rail and said second side rail with clips.

20. The support structure as in claim 18 wherein said transverse wires incorporate angled portions.

21. The support structure as in claim 18 wherein said first cross bar and said second cross bar incorporate angled portions.

22. The support structure as in claim 18 wherein said transverse wires are wound around said first side rail and said second side rail to fixedly attach.

23. The support structure as in claim 18 further comprising a seat frame, wherein said support structure is suspended in said seat frame.

24. The support structure as in claim 18 wherein one or a plurality of said transverse wires extend laterally beyond said first side rail and said second side rail after having been wound around said first side rail and said second side rail.

25. The support structure as in claim 24 further comprising a seat frame wherein one or a plurality of said transverse wires extending beyond said first side rail and said second side rail connects to said seat frame.

26. The support structure as in claim 18 wherein one or a plurality of brackets are fixedly attached to said first side rail and said second side rail.

27. The support structure as in claim 26 further comprising a seat frame wherein one or a plurality of said brackets fixedly attach to said seat frame.

28. The support structure as in claim 18 further comprising a central longitudinal cord, said central longitudinal cord is fixedly attached to the mid points of said transverse wires.

29. The support structure as in claim 18 further comprising an adjusting mechanism operatively connected to said first side rail and said second side rail.

30. The support structure as in claim 18 further comprising a pair of brackets, wherein one of said brackets is fixedly attached to one of said first side rail and said second side rail.

31. The support structure as in claim 30 further comprising a pair of Bowden cables; wherein each of said Bowden cables has a first end and a second end and each of said first ends are slidably inserted through one of said brackets.

32. The support structure as in claim 31 further comprising an actuator, wherein said second ends of said Bowden cables are fixedly attached to said actuator.

33. The support structure as in claim 18 wherein the average bending stiffness of said first cross-bar and said second cross-bar is greater than the average bending stiffness of all of said transverse wires.

34. The support structure as in claim 18 wherein said first cross-bar and said second cross are extensions of one of said first portion and said second portion of one of said first side rail and second side rail.

35. A seatback support lumbar structure comprising:
a pair of side rails, wherein each of said side rails has a first end and a second end, wherein said second ends of said side rails are angled and wherein each of said second ends extends from one of said pair of side rails and is fixedly attached to an opposite one of said pair of side rails to form an X-shape;
a plurality of transverse wires, said transverse wires having first and second ends wherein one of said ends is fixedly attached to one of said side rails and the other said end is fixedly attached to other said side rail;
a central longitudinal cord, said central longitudinal cord is fixedly attached to the mid points of said transverse wires;
a pair of brackets, wherein one of said brackets is fixedly attached to one of said side rails;
a pair of Bowden cables; wherein each of said Bowden cables has a first end and a second end and each of said first ends are slidably inserted through one of said brackets; and
an actuator, wherein said second ends of said Bowden cables are fixedly attached to said actuator.

36. The support structure as in claim 35 wherein said second ends of said side rails are fixedly attached to other said side rail with clips.

37. The support structure as in claim 35 wherein said transverse wires incorporate angled portions.

38. The support structure as in claim 35 wherein said pair of side rails incorporate angled portions.

39. The support structure as in claim 35 wherein said transverse wires are wound around said pair of side rails to fixedly attach.

40. The support structure as in claim 35 further comprising a seat frame, wherein said support structure is suspended in said seat frame.

41. The support structure as in claim 35 wherein one or a plurality of said transverse wires extend laterally beyond said pair of side rails after having been wound around said pair of side rails.

42. The support structure as in claim 41 further comprising a seat frame wherein one or a plurality of said transverse wires extending beyond said pair of side rails is fixedly connected to said seat frame.

43. The support structure as in claim 35 wherein one or a plurality of brackets are fixedly attached to said pair of side rails.

44. The support structure as in claim 43 further comprising a seat frame wherein one or a plurality of said brackets are fixedly attached to said seat frame.

45. The support structure as in claim 35 wherein the average bending stiffness of said transverse wires is less than the average bending stiffness of said pair of side rails.

* * * * *